United States Patent [19]

Ross et al.

[11] 4,134,279
[45] Jan. 16, 1979

[54] PROTECTIVE SAFETY LOCK

[76] Inventors: Steven G. Ross, 201-04 Epsom Cause, Queens Village, N.Y. 11427; Jeffrey M. Ladisic, 17-19 Clintinville St., Whitestone, N.Y. 11357

[21] Appl. No.: 789,932

[22] Filed: Apr. 22, 1977

[51] Int. Cl.² .......................................... E05B 65/12
[52] U.S. Cl. ................................................ 70/18
[58] Field of Search .................... 70/18, 19, 237, 252, 70/14

[56] References Cited
U.S. PATENT DOCUMENTS

| | | | |
|---|---|---|---|
| 3,811,303 | 5/1974 | Robertson | 70/18 X |
| 4,020,662 | 5/1977 | Fowler | 70/18 X |

Primary Examiner—Richard E. Moore

[57] ABSTRACT

In a steering column locking device a further protective mechanism for said locking device composed of an enclosure composed of two substantially semi-circular side walls, structurally hinged by concealed hinges at each of one extreme, a pair of open chambers forming a part of the other extremities of the side walls, the chambers being slidable one within the other. A cylindrical lock mechanism is carried by one open chamber and is keyed to operate a slug depending from the lock so that the slug engages an aperture in the other chamber thereby locking the two semi-circular walls about the steering column locking device.

4 Claims, 9 Drawing Figures

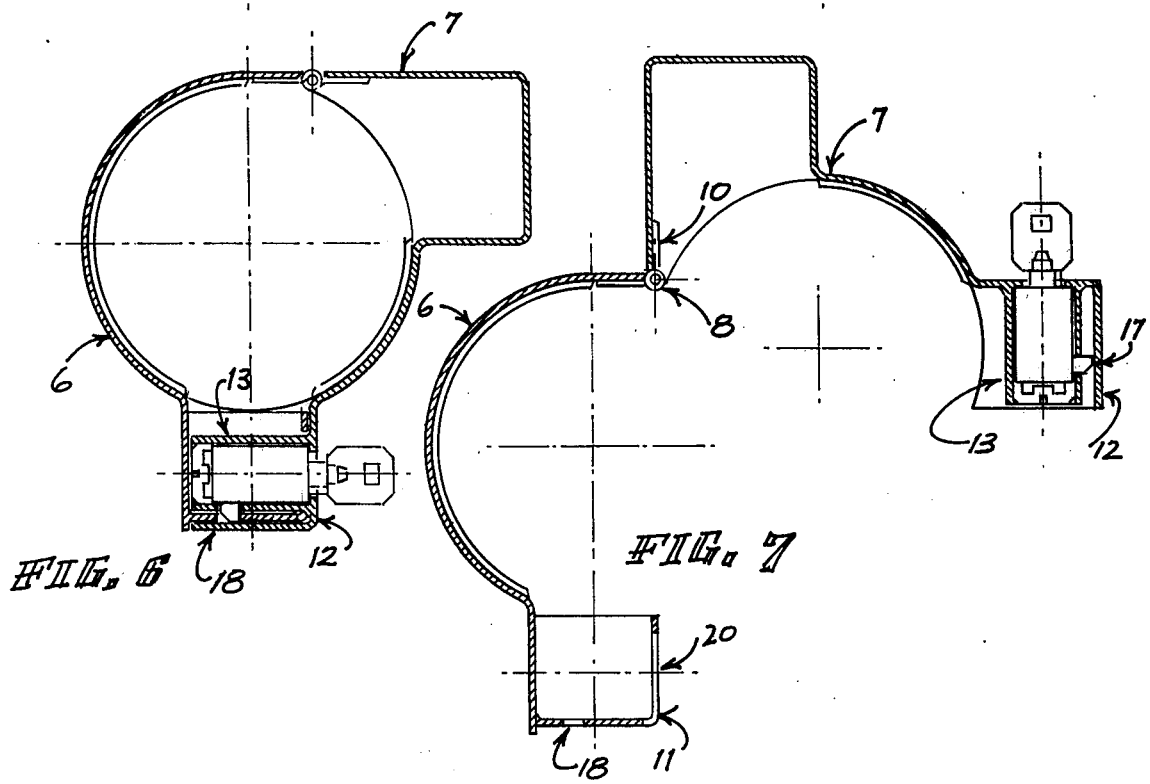

PROTECTIVE SAFETY LOCK

Steering lock mechanisms have been devised to lock and secure the steering columns to prevent theft and or otherwise unauthorized movement of the vehicle. However, the very nature of the lock structure permits easy rupture and dislodgement of the complete tumbler so that the removal thereof by shocking means such as by the use of a sharp blow with an impact device is feasible.

To prevent access to the lock and tumbler what is contemplated by the instant invention is to completely surround the tumbler mechanism by a fool-proof protective shield made of durable steel and itself inaccessible by ordinary and shocking means and mechanisms.

It is therefore a principle object of the invention to provide an improved steering wheel lock mechanism which is fool-proof and inaccessible by ordinary and usual shocking tools and devices.

A stiff further object of the invention is to provide a simple and efficient protective locking device which is inexpensive and easy to apply to the steering wheel.

Another object of the invention is to provide a steering-lock protective device easily adaptable to different car makes and wheel designs.

Further objects and advantages will become apparent from a reading of the specifications and a study of the accompanying drawings and wherein:

FIGS. 3, 4, 5 show plan, elevation and end views of the lock-proof mechanism according to the invention.

FIGS. 6 and 7 sectionally show the lock-proof mechanism engaged and disengaged with a novel tumbler lock mechanism and engaging key according to the invention.

Figure 8:
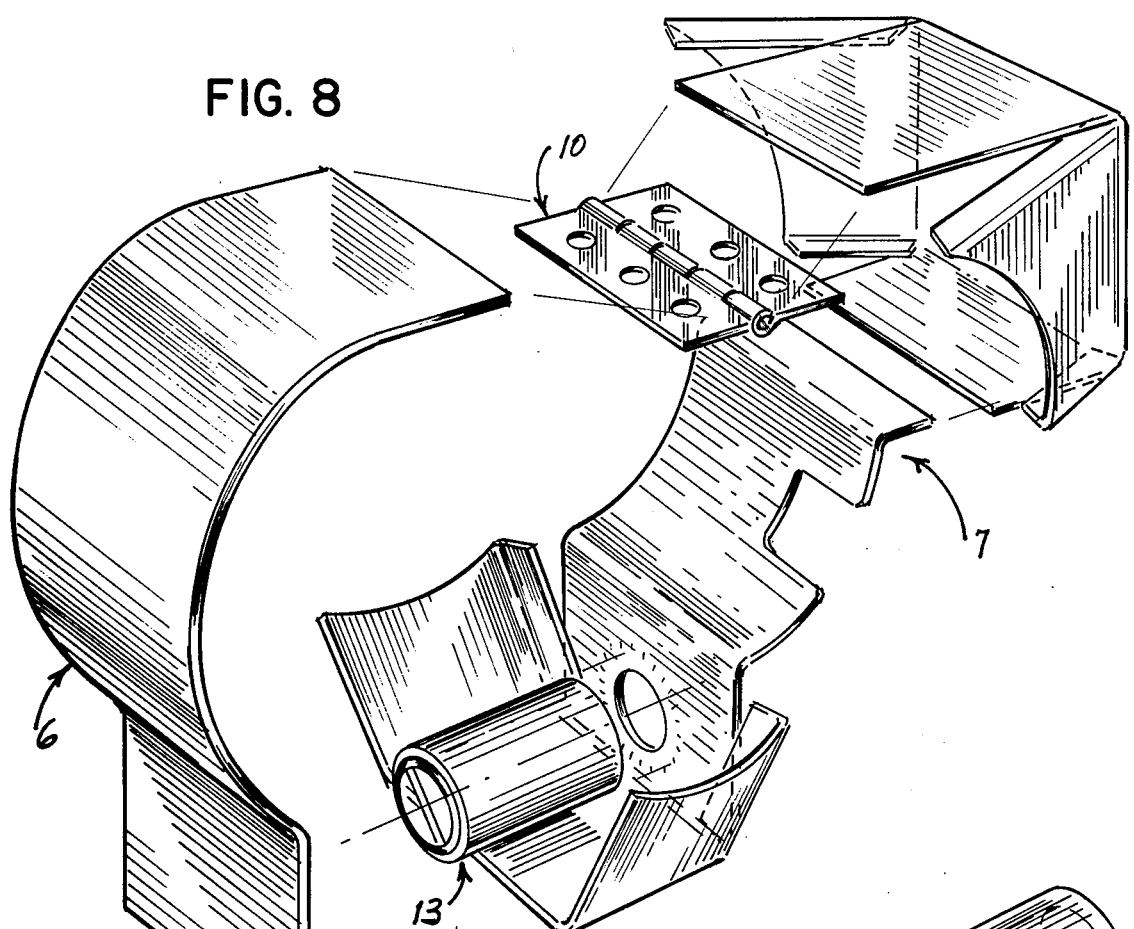

FIG. 8 shows an exploded view of the assembly.

Figure 9:
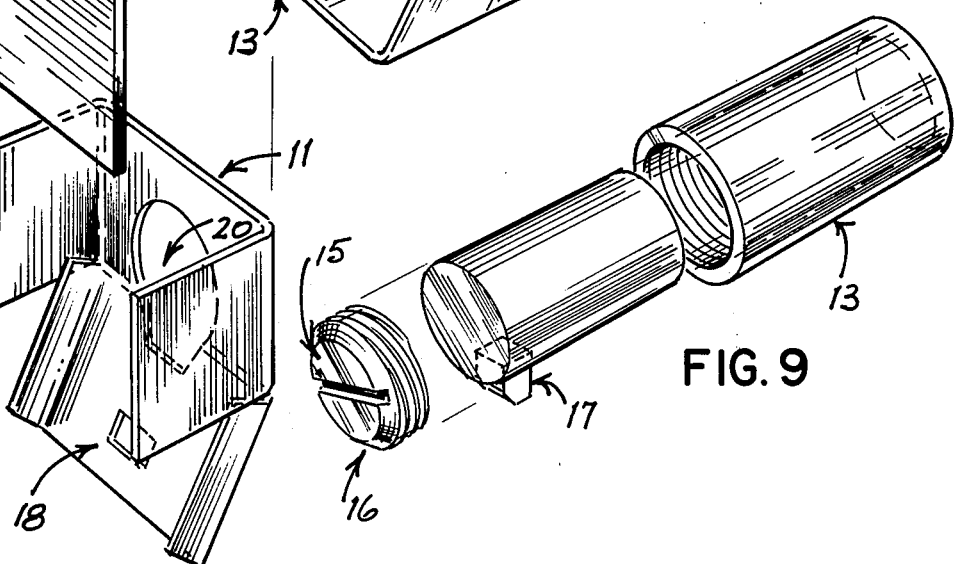

FIG. 9 shows sectionally the tumbler lock mechanism functionally operative in FIGS. 7 and 8.

Figure 1:
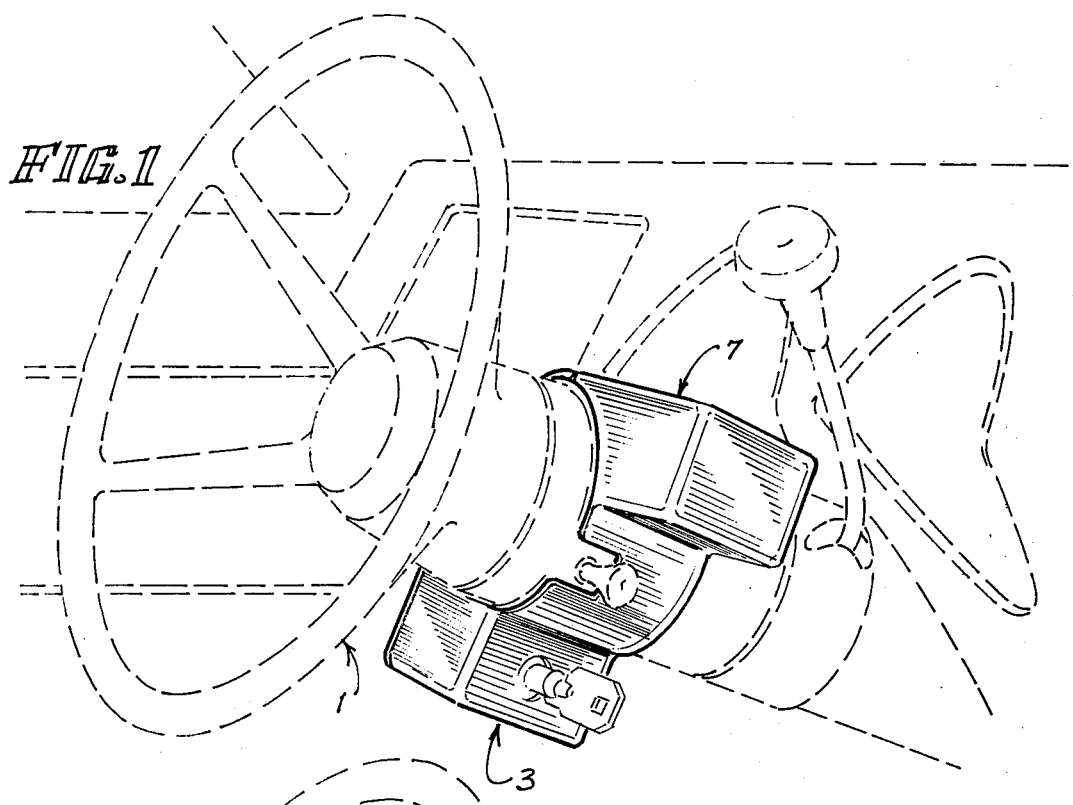
FIGS. 1 and 2 show a typical steering wheel and column mechanism with the lock-proof mechanism engaged and disengaged according to the invention herein.
Figure 2:
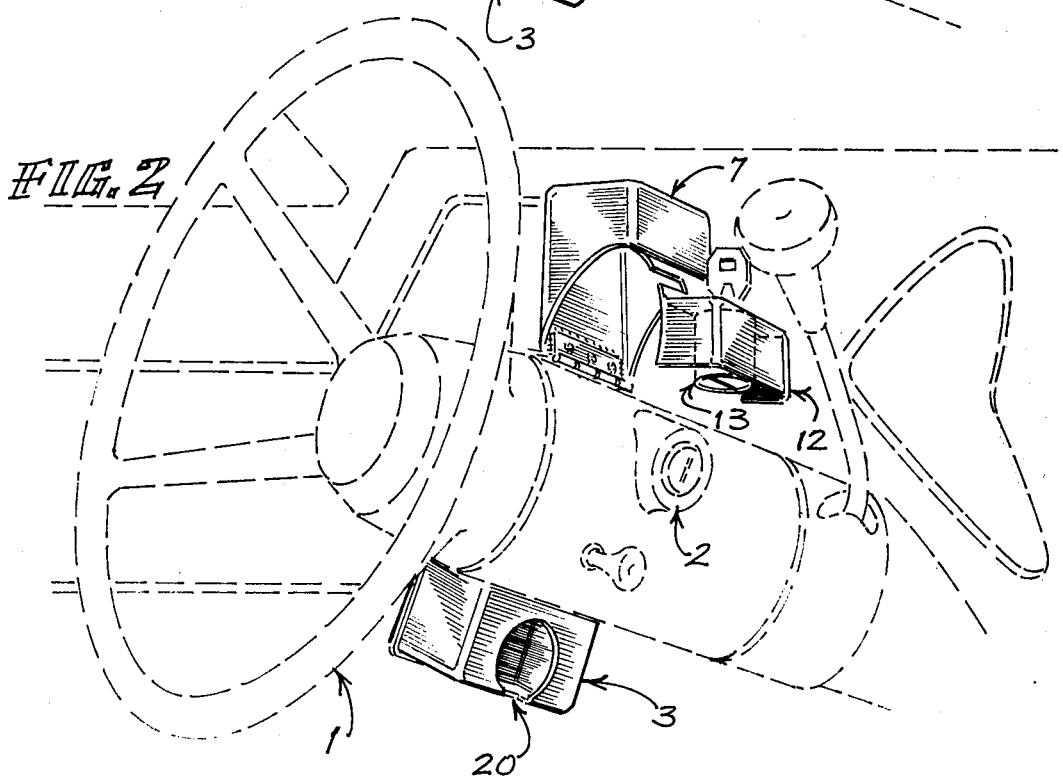

Now describing the invention in particular and describing the various individual parts by reference numbers, and wherever possible identifying like parts with like reference numbers, FIGS. 1 and 2 show a steering wheel and column 1 having the usual steering lock 2 disposed to locking the functioning of the steering column to cause complete immobility of the steering capability of the vehicle. The obvious exposure of said lock 2 permits easy manipulation by intruders by the use of shock or jolt type equipment so that the true purpose of said lock is completely destroyed.

The steering column 1 has attached thereto a steering lock protector or guard 3 which in FIG. 1 is completely engaged and functional and in FIG. 2 is completely exposed, open and disengaged. In particular the steering lock guard 3 comprises an enclosure 5, as shown in FIGS. 3, 4 and 5, composed of essentially two semi-circular sections 6 and 7 as shown in FIG. 8, the sections being hingedly integrally connected at an extremity 8 of each of the sections by an unexposed hinge 10 attached to the internal portions of the respective sections.

The enclosure 5 is essentially metal, but is not limited thereto, but that other structural materials are available such as fiber glass and other forms of plastic derivatives. The enclosure 5 further comprises a pair of extended chambers 11 and 12, one of which 12, supports a cylindrial lock member 13, specifically shown in closer detail in FIG. 9. The lock member 13 is composed of a threadable shaft 15 disposed to rotate by engaging its slotted key-way in a manner to activate a retractable slug 17 which normally engages an apertured-hole 18 perforated through the furthest extremity of the extended chamber 11, when the chambers 11 and 12 are engageable and functional as shown in FIG. 7.

The semi-circular section 7 further comprises an enlarged extended open chamber disposed to conceal, protect, and assure that the steering lock 2 is completely enclosed and protected when the protective mechanism is functionally operative.

In operation the protective mechanism 3 is at first disengaged as in FIG. 2, the mechanism being either preferably carried by the steering column or being a portable type which can be secured manually. The portective mechanism, to functionally operate is strapped about the steering column as shown in FIG. 1, the extended open chambers 11 and 12 completely meshing, the chamber 12 meshing into chamber 11, with the cylindrical lock member 13 penetrating the open aperture 20 cut into the said chamber 11. When the semi-circular sections are so functioning, the extended chamber conceals the steering lock and secures same.

The protective device is fool-proof in that the concealed hinged 8 is not exposed and cannot be penetrated or tampered with. The protective lock member 13 is also completely concealed and not suscepted to being tampered with by virtue of the peculiar key and screw arrangement forming an integral part of the basic cylindrical lock member.

Having described the invention with certain particularities and also being aware that the invention comprises additional embodiments not particularly shown or described, but that those embodiment herein preferably described are for the purpose of all encompassing those other embodiments not so particularly described.

FIG. 9 shows an exploded view of the protective device with the various parts and how they integrate into a completed assembly as shown by the other drawings in the case to form a fool-proof ignition lock protective system.

Having described the invention what is claimed is:

1. In a steering column locking mechanism a protective device therefor comprising;
   (a) an enclosure composed of two hingedly connected semicircular housings each disposed to wrap around said steering column,
   (b) open chamber means forming an integral part of each of said housings and carried thereby and disposed to reside within each other when the said enclosure is wrapped around said steering column,
   (c) concealed locking means supported by one of said chambers and disposed to engage the other chamber in locked engagement when the chambers reside within each other.

2. In a protective device according to claim 1 and wherein said chamber locking means includes an internally threaded cylinder having movable slug means traversable therein, and disposed to engage the other chamber in locked engagement.

3. In a protective device according to claim 2 and wherein said movable plug means includes depending member means mavable with said plug and disposed to engage the other chamber in locked engagement.

4. In a protective device according to claim 3 and wherein the depending member means includes a beveled slug disposed to engage and fit into an apertured hole in the other chamber to lock the chambers to each other and being further disposed to dis-engage when the plug is moved in the reverse direction.

* * * * *